(No Model.)

R. E. WARDHAUGH.
DUST COLLECTOR.

No. 470,523.  Patented Mar. 8, 1892.

WITNESSES:
Fred G. Dieterich
P. B. Turpin

INVENTOR:
R. E. Wardhaugh
BY Munn & Co
ATTORNEYS.

UNITED STATES PATENT OFFICE.

RICHARD EDWARD WARDHAUGH, OF JACKSONVILLE, ILLINOIS, ASSIGNOR TO EDWARD P. ALLIS & CO., OF MILWAUKEE, WISCONSIN.

DUST-COLLECTOR.

SPECIFICATION forming part of Letters Patent No. 470,523, dated March 8, 1892.

Application filed July 19, 1887. Serial No. 244,789. (No model.)

*To all whom it may concern:*

Be it known that I, RICHARD EDWARD WARDHAUGH, of Jacksonville, in the county of Morgan and State of Illinois, have invented a new and useful Improvement in Dust-Collectors, of which the following is a specification.

My invention is an improvement in that class of dust-collectors for use in flour-mills in which the blast of dust-laden air is forced into a collecting-chamber and circulates therein, the dust being freed and deposited in said chamber, while the air freed of dust passes upward out of such chamber.
The present invention seeks to provide means for clearing the dust deposited in the chamber from the sides thereof; and the invention consists in certain features of construction and novel combinations of parts, as will be described and claimed.

Figure 1:
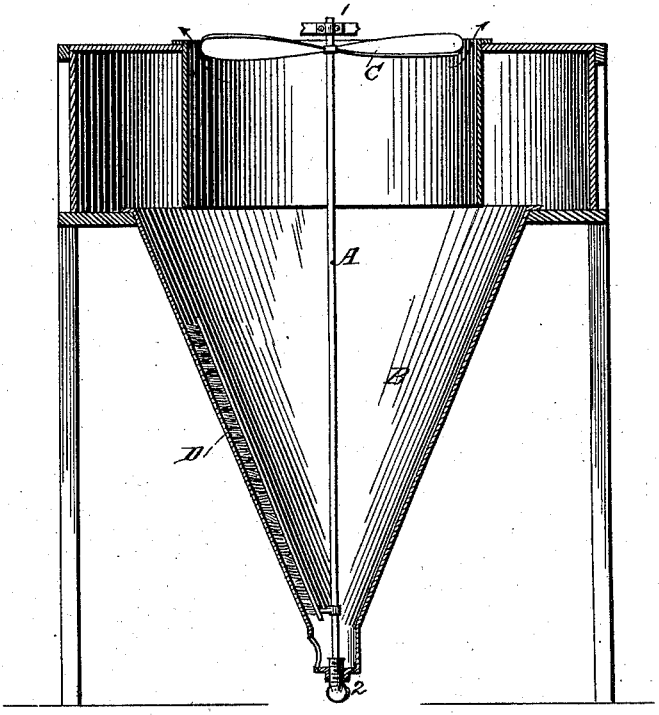
Figure 2:
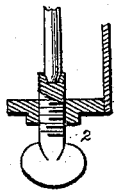

In the drawings, Figure 1 is a vertical section of a dust-collector provided with my improvements, and Fig. 2 is a detail view.

As my invention pertains to the devices for brushing or cleaning the dust from the walls of the collecting-chamber or cone, no particular description of the dust-collector proper need be made herein.

The shaft A is journaled concentrically within the collecting-chamber B, being journaled in suitable bearings 1 and 2. The wind-wheel C is connected with the shaft, and is arranged to be operated by the exhaust-air from the collector. To the shaft is connected the brush D, which may have fibers or other brushing material, as shown, or may be simply a board to scrape the dust off the walls of the chamber.

It is manifest that the particular construction of the wind-wheel, as well as that of the brush, may be modified or varied without departing from my invention.

In operation the wind-wheel, and by it the shaft and brush, may be operated by the exhaust-air, and the collecting-chamber will consequently be kept clear and clean of the dust.

The separation of flour-dust from an air-current through centrifugal action is set forth in French patent to Perrigault, dated September 12, 1856, and numbered 17,013, and the principle of eliminating solid or heavy particles of matter from moving bodies of gas, smoke, air, steam, &c., has long been applied in practice. Thus a spark-arrester comprising a casing or body of cylindrical form in its upper part and of conical form at its lower end, with an outlet at the lower end for the sparks and matters separated from the moving current and a central air-outlet at the top, together with a tangential inlet or series of inlets through which the air enters the separating-chamber, is found in Letters Patent to W. C. Grimes, dated February 12, 1842, No. 2,455; reissued December 25, 1855, No. 335; also in patent to the same party, dated September 23, 1845, and numbered 4,205. United States patent to Freeman and Payton, dated May 31, 1870, No. 103,731, and No. 113,155, dated March 28, 1871, disclose a like construction and also a depending circular guard or apron around the central air-outlet at the top of the separating-chambers. A water-filter comprising a conical separating-chamber with outlet at the lower end for the collected matter and an outlet at the upper end for the purified water and a tangential inlet through which the water to be purified is introduced is found in Letters Patent of the United States to J. G. Lefler, dated January 15, 1864, No. 41,075. Steam driers or separators embodying a circular chamber, a tangential steam-inlet, a central dry-steam outlet provided with a tubular guard or apron, an outlet for the water removed from the steam, and a tangential inlet through which the steam enters and by reason of which it assumes a vertical movement are found in United States patents to R. C. Bristol, December 18, 1866, No. 60,470; to Babcock, Wilcox, and Pratt, November 15, 1881, No. 249,446; to E. P. Stratton, August 4, 1885, No. 323,891, and steam-separators constructed upon this plan have been in extensive use for a number of years in this country. These are a few of many instances that might be cited. For these reasons I make no broad claim to an apparatus consisting of a conical separating-chamber provided with an inlet, a central outlet for the escape of the purified current surrounded by a tubular guard, and a discharge-opening for the particles removed from the current.

Having thus described my invention, what I claim as new is—

5. The combination of the dust-collecting chamber, the shaft extended therein, suitable bearings for said shaft, and a wind-wheel and brush connected with said shaft, all substantially as and for the purposes specified.

RICHARD EDWARD WARDHAUGH.

Witnesses:
JOHN DEVELIN,
JAMES H. KELLOGG.